United States Patent [19]

Nishikawa et al.

[11] Patent Number: 5,327,299

[45] Date of Patent: Jul. 5, 1994

[54] METHOD OF ENCODING POSITION INFORMATION

[75] Inventors: Keiichi Nishikawa; Yuji Ohmura, both of Kamakura, Japan

[73] Assignee: Mitsubishi Denki Kabushiki Kaisha, Tokyo, Japan

[21] Appl. No.: 59,724

[22] Filed: May 10, 1993

Related U.S. Application Data

[63] Continuation of Ser. No. 478,643, Feb. 12, 1990, abandoned.

[30] Foreign Application Priority Data

Feb. 22, 1989 [JP] Japan .................................. 1-42211

[51] Int. Cl.⁵ .............................................. G11B 21/08
[52] U.S. Cl. .................................... 360/48; 360/78.04
[58] Field of Search ................................. 360/69, 48

[56] References Cited

U.S. PATENT DOCUMENTS 4,418,368 11/1983 Nalley et al. ................. 360/78.14
4,823,212 4/1989 Knowles et al. .

Primary Examiner—Vincent P. Canney
Attorney, Agent, or Firm—Wolf, Greenfield & Sacks

[57] ABSTRACT

A method of encoding position information of each recording portion on a recording medium with a predetermined number of information units, which includes the step of composing position information codes such that the first position information code of the first recording portion is different by one information unit from the second position information code of the second recording portion which is spaced by one recording portion from the first recording portion, by two information units from the third position information code of the third recording portion which is spaced by two recording portions, and by three information units or more from the fourth position information code of the fourth recording portion which is spaced by three recording portions or more.

21 Claims, 14 Drawing Sheets

| 10<br>ADDRESS<br>INFORMATION | 11<br>ADDRESS<br>INFORMATION CODE | 12<br>NO. OF DIFFER-<br>ENT BITS |
|---|---|---|
| 1  | 0 0 0 0 0 0 1 1 1 | 5 |
| 2  | 0 0 0 0 0 1 1 1 1 | 4 |
| 3  | 0 0 0 0 0 1 1 1 0 | 3 |
| 4  | 0 0 0 0 1 1 1 1 0 | 2 |
| 5  | 0 0 0 0 1 1 1 0 0 | 1 |
| 6  | 0 0 0 1 1 1 1 0 0 | 0 |
| 7  | 0 0 0 1 1 1 0 0 0 | 1 |
| 8  | 0 0 0 1 1 1 1 0 0 0 | 2 |
| 9  | 0 0 0 1 1 1 0 0 0 0 | 3 |
| 10 | 0 0 0 1 1 1 0 0 0 1 | 4 |
| 11 | 0 0 1 1 1 1 0 0 0 1 | 5 |
| 12 | 0 0 1 1 1 0 0 0 0 1 | 6 |
| 13 | 0 0 1 1 1 0 0 0 1 1 | 7 |
| 14 | 0 1 1 1 1 0 0 0 1 1 | 8 |
| 15 | 0 1 1 1 0 0 0 0 1 1 | 9 |
| 16 | 0 1 1 1 0 0 0 1 1 1 | 8 |
| 17 | 1 1 1 1 0 0 0 1 1 1 | 9 |
| 18 | 1 1 1 1 0 0 1 1 1 1 | 8 |
| 19 | 1 1 1 1 0 0 1 1 1 0 | 7 |
| 20 | 1 1 1 1 0 1 1 1 1 0 | 6 |
| 21 | 1 1 1 1 0 1 1 1 0 0 | 5 |
| 22 | 1 1 1 1 1 1 1 0 0 | 4 |
| 23 | 1 1 1 1 1 1 0 0 0 | 5 |
| 24 | 1 1 1 1 1 0 0 0 0 | 6 |
| 25 | 1 1 1 1 0 0 0 0 0 | 7 |
| 26 | 1 1 1 1 0 0 0 0 0 0 | 8 |
| 27 | 1 1 1 0 0 0 0 0 0 | 7 |
| 28 | 1 1 1 0 0 0 0 0 1 | 8 |
| 29 | 1 1 0 0 0 0 0 0 1 | 7 |
| 30 | 1 1 0 0 0 0 0 1 1 | 8 |
| 31 | 1 0 0 0 0 0 0 1 1 | 7 |
| 32 | 0 0 0 0 0 0 0 1 1 | 6 |

FIG. 1

| ADDRESS INFORMATION (10) | ADDRESS INFORMATION CODE (11) | NO. OF DIFFERENT BITS (12) |
|---|---|---|
| 1 | 0 0 0 0 0 0 0 1 1 1 | 5 |
| 2 | 0 0 0 0 0 0 1 1 1 1 | 4 |
| 3 | 0 0 0 0 0 0 1 1 1 0 | 3 |
| 4 | 0 0 0 0 0 1 1 1 1 0 | 2 |
| 5 | 0 0 0 0 0 1 1 1 0 0 | 1 |
| 6 | 0 0 0 0 1 1 1 1 0 0 | 0 |
| 7 | 0 0 0 0 1 1 1 0 0 0 | 1 |
| 8 | 0 0 0 1 1 1 1 0 0 0 | 2 |
| 9 | 0 0 0 1 1 1 0 0 0 0 | 3 |
| 10 | 0 0 0 1 1 1 0 0 0 1 | 4 |
| 11 | 0 0 1 1 1 1 0 0 0 1 | 5 |
| 12 | 0 0 1 1 1 0 0 0 0 1 | 6 |
| 13 | 0 0 1 1 1 0 0 0 1 1 | 7 |
| 14 | 0 1 1 1 1 0 0 0 1 1 | 8 |
| 15 | 0 1 1 1 0 0 0 0 1 1 | 9 |
| 16 | 0 1 1 1 0 0 0 1 1 1 | 8 |
| 17 | 1 1 1 1 0 0 0 1 1 1 | 9 |
| 18 | 1 1 1 1 0 0 1 1 1 1 | 8 |
| 19 | 1 1 1 1 0 0 1 1 1 0 | 7 |
| 20 | 1 1 1 1 0 1 1 1 1 0 | 6 |
| 21 | 1 1 1 1 0 1 1 1 0 0 | 5 |
| 22 | 1 1 1 1 1 1 1 1 0 0 | 4 |
| 23 | 1 1 1 1 1 1 1 0 0 0 | 5 |
| 24 | 1 1 1 1 1 1 0 0 0 0 | 6 |
| 25 | 1 1 1 1 1 0 0 0 0 0 | 7 |
| 26 | 1 1 1 1 0 0 0 0 0 0 | 8 |
| 27 | 1 1 1 0 0 0 0 0 0 0 | 7 |
| 28 | 1 1 1 0 0 0 0 0 0 1 | 8 |
| 29 | 1 1 0 0 0 0 0 0 0 1 | 7 |
| 30 | 1 1 0 0 0 0 0 0 1 1 | 8 |
| 31 | 1 0 0 0 0 0 0 0 1 1 | 7 |
| 32 | 0 0 0 0 0 0 0 0 1 1 | 6 |

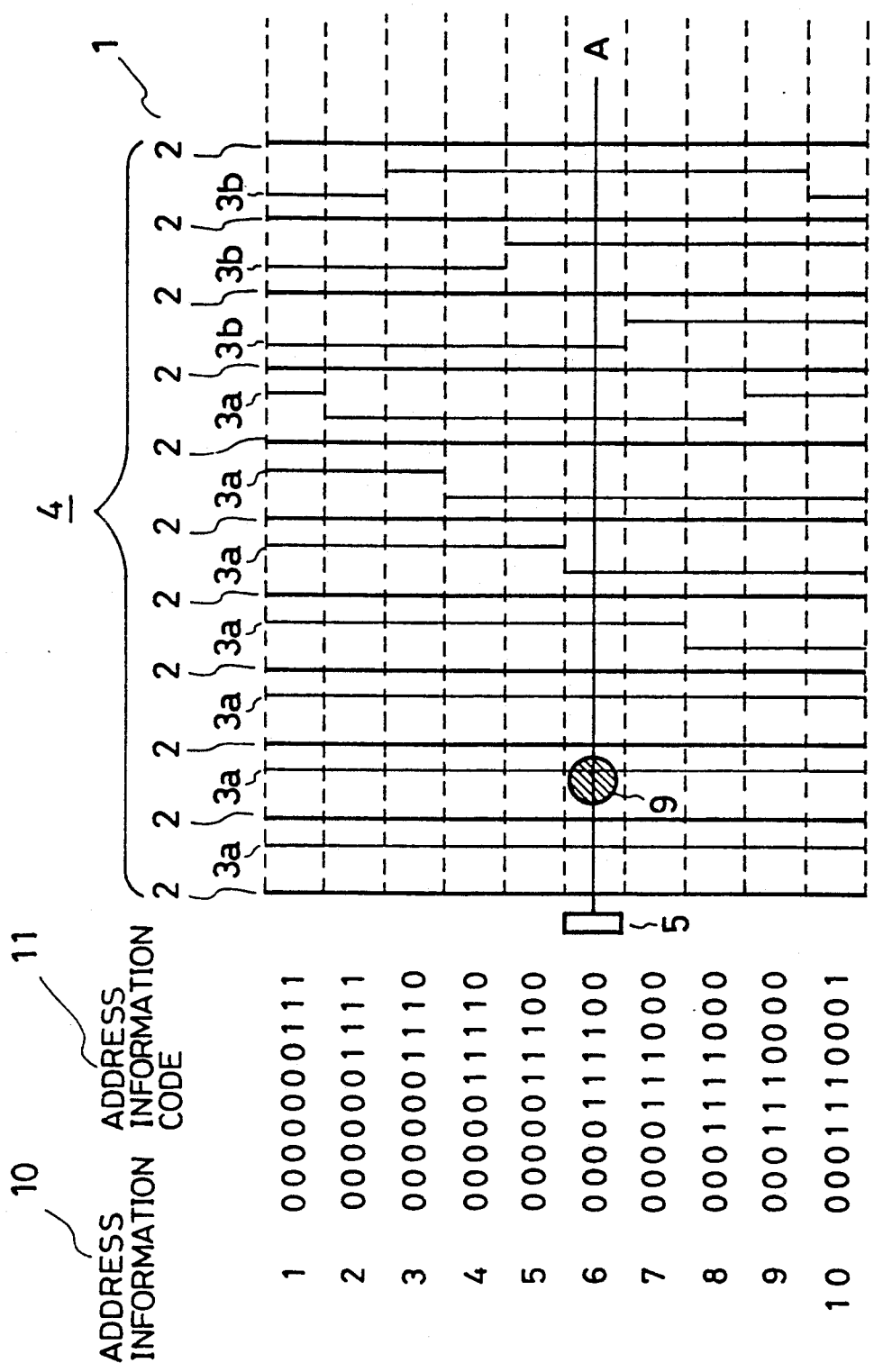

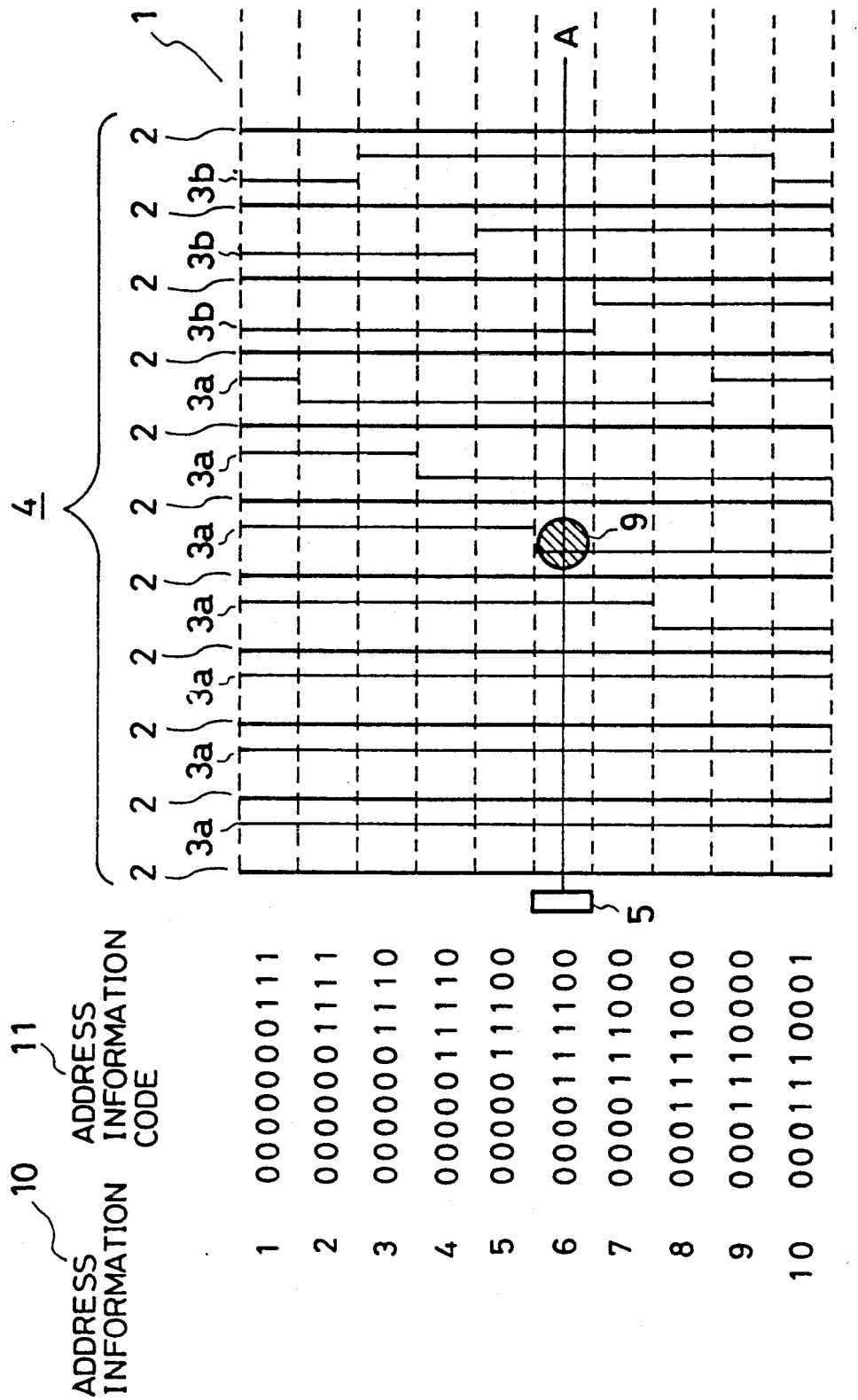

FIG. 8

| ADDRESS INFORMATION (10) | ADDRESS INFORMATION CODE (11) | NO. OF DIFFERENT BITS (12) |
|---|---|---|
| 1 | 0 0 0 0 0 0 0 1 1 1 | 6 |
| 2 | 0 0 0 0 0 0 1 1 1 1 | 7 |
| 3 | 0 0 0 0 0 0 1 1 1 0 | 8 |
| 4 | 0 0 0 0 0 1 1 1 1 0 | 9 |
| 5 | 0 0 0 0 0 1 1 1 0 0 | 8 |
| 6 | 0 0 0 0 1 1 1 1 0 0 | 7 |
| 7 | 0 0 0 0 1 1 1 0 0 0 | 6 |
| 8 | 0 0 0 1 1 1 1 0 0 0 | 5 |
| 9 | 0 0 0 1 1 1 0 0 0 0 | 4 |
| 10 | 0 0 1 1 1 1 0 0 0 0 | 3 |
| 11 | 0 0 1 1 1 0 0 0 0 0 | 2 |
| 12 | 0 0 1 1 1 0 0 0 0 1 | 1 |
| 13 | 0 1 1 1 1 0 0 0 0 1 | 0 |
| 14 | 0 1 1 1 1 0 0 0 1 1 | 1 |
| 15 | 0 1 1 1 0 0 0 0 1 1 | 2 |
| 16 | 0 1 1 1 0 0 0 1 1 1 | 3 |
| 17 | 0 1 1 1 0 0 1 1 1 1 | 4 |
| 18 | 0 1 1 1 0 0 1 1 1 0 | 5 |
| 19 | 0 1 1 1 0 1 1 1 1 0 | 6 |
| 20 | 0 1 1 1 0 1 1 1 0 0 | 5 |
| 21 | 0 1 1 1 1 1 1 1 0 0 | 4 |
| 22 | 1 1 1 1 1 1 1 1 0 0 | 5 |
| 23 | 1 1 1 1 1 1 1 0 0 0 | 4 |
| 24 | 1 1 1 1 1 1 0 0 0 0 | 3 |
| 25 | 1 1 1 1 1 0 0 0 0 0 | 2 |
| 26 | 1 1 1 1 0 0 0 0 0 0 | 3 |
| 27 | 1 1 1 1 0 0 0 0 0 1 | 2 |
| 28 | 1 1 1 0 0 0 0 0 0 1 | 3 |
| 29 | 1 1 0 0 0 0 0 0 0 1 | 4 |
| 30 | 1 0 0 0 0 0 0 0 1 1 | 5 |
| 31 | 1 0 0 0 0 0 0 1 1 1 | 6 |
| 32 | 1 0 0 0 0 0 1 1 1 1 | 7 |
| X X | 0 1 1 1 0 0 0 0 0 1 | |

FIG. 9

| ADDRESS INFORMATION | ADDRESS INFORMATION CODE |
|---|---|
| 1 | 0 0 0 0 0 0 0 1 1 1 |
| 2 | 0 0 0 0 0 0 1 1 1 1 |
| 3 | 0 0 0 0 0 0 1 1 1 0 |
| 4 | 0 0 0 0 0 1 1 1 1 0 |
| 5 | 0 0 0 0 0 1 1 1 0 0 |
| 6 | 0 0 0 0 1 1 1 1 0 0 |
| 7 | 0 0 0 0 1 1 1 0 0 0 |
| 8 | 0 0 0 1 1 1 1 0 0 0 |
| 9 | 0 0 0 1 1 1 0 0 0 0 |
| 10 | 0 0 0 1 1 1 0 0 0 1 |
| 11 | 0 0 1 1 1 1 0 0 0 1 |
| 12 | 0 0 1 1 1 0 0 0 0 1 |
| 13 | 0 0 1 1 1 0 0 0 1 1 |
| 14 | 0 1 1 1 1 0 0 0 1 1 |
| 15 | 0 1 1 1 0 0 0 0 1 1 |
| 16 | 0 1 1 1 0 0 0 1 1 1 |
| 17 | 1 1 1 1 0 0 0 1 1 1 |
| 18 | 1 1 1 1 0 0 1 1 1 1 |
| 19 | 1 1 1 1 0 0 1 1 1 0 |
| 20 | 1 1 1 1 0 1 1 1 1 0 |
| 21 | 1 1 1 1 0 1 1 1 0 0 |
| 22 | 1 1 1 1 1 1 1 1 0 0 |
| 23 | 1 1 1 1 1 1 1 0 0 0 |
| 24 | 1 1 1 1 1 1 0 0 0 0 |
| 25 | 1 1 1 1 1 0 0 0 0 0 |
| 26 | 1 1 1 1 0 0 0 0 0 0 |
| 27 | 1 1 1 1 0 0 0 0 0 1 |
| 28 | 1 1 1 0 0 0 0 0 0 1 |
| 29 | 1 1 1 0 0 0 0 0 1 1 |
| 30 | 1 1 0 0 0 0 0 0 1 1 |
| 31 | 1 1 0 0 0 0 0 1 1 1 |
| 32 | 1 0 0 0 0 0 0 1 1 1 |

FIG. 10

| ADDRESS INFORMATION | ADDRESS INFORMATION CODE |
|---|---|
| 1 | 0 0 0 0 0 0 0 1 1 1 0 0 1 1 0 0 |
| 2 | 0 0 0 0 0 0 1 1 1 1 0 0 1 1 0 0 |
| 3 | 0 0 0 0 0 0 1 1 1 0 0 0 1 1 0 0 |
| 4 | 0 0 0 0 0 1 1 1 1 0 0 0 1 1 0 0 |
| 5 | 0 0 0 0 0 1 1 1 0 0 0 0 1 1 0 0 |
| 6 | 0 0 0 0 1 1 1 1 0 0 0 0 1 1 0 0 |
| 7 | 0 0 0 0 1 1 1 0 0 0 0 0 1 1 0 0 |
| 8 | 0 0 0 1 1 1 1 0 0 0 0 0 1 1 0 0 |
| 9 | 0 0 0 1 1 1 0 0 0 0 0 0 1 1 0 0 |
| 10 | 0 0 0 1 1 1 0 0 0 1 0 0 1 1 0 0 |
| 11 | 0 0 1 1 1 1 0 0 0 1 0 0 1 1 0 0 |
| 12 | 0 0 1 1 1 0 0 0 0 1 0 0 1 1 0 0 |
| 13 | 0 0 1 1 1 0 0 0 1 1 0 0 1 1 0 0 |
| 14 | 0 1 1 1 1 0 0 0 1 1 0 0 1 1 0 0 |
| 15 | 0 1 1 1 0 0 0 0 1 1 0 0 1 1 0 0 |
| 16 | 0 1 1 1 0 0 0 1 1 1 0 0 1 1 0 0 |
| 17 | 1 1 1 1 0 0 0 1 1 1 0 0 1 1 0 0 |
| 18 | 1 1 1 1 0 0 1 1 1 1 0 0 1 1 0 0 |
| 19 | 1 1 1 1 0 0 1 1 1 0 0 0 1 1 0 0 |
| 20 | 1 1 1 1 0 1 1 1 1 0 0 0 1 1 0 0 |
| 21 | 1 1 1 1 0 1 1 1 0 0 0 0 1 1 0 0 |
| 22 | 1 1 1 1 1 1 1 1 0 0 0 0 1 1 0 0 |
| 23 | 1 1 1 1 1 1 1 0 0 0 0 0 1 1 0 0 |
| 24 | 1 1 1 1 1 1 0 0 0 0 0 0 1 1 0 0 |
| 25 | 1 1 1 1 1 0 0 0 0 0 0 0 1 1 0 0 |
| 26 | 1 1 1 1 0 0 0 0 0 0 0 0 1 1 0 0 |
| 27 | 1 1 1 0 0 0 0 0 0 0 0 0 1 1 0 0 |
| 28 | 1 1 1 0 0 0 0 0 0 1 0 0 1 1 0 0 |
| 29 | 1 1 0 0 0 0 0 0 0 1 0 0 1 1 0 0 |
| 30 | 1 1 0 0 0 0 0 0 1 1 0 0 1 1 0 0 |
| 31 | 1 0 0 0 0 0 0 0 1 1 0 0 1 1 0 0 |
| 32 | 0 0 0 0 0 0 0 0 1 1 0 0 1 1 0 0 |

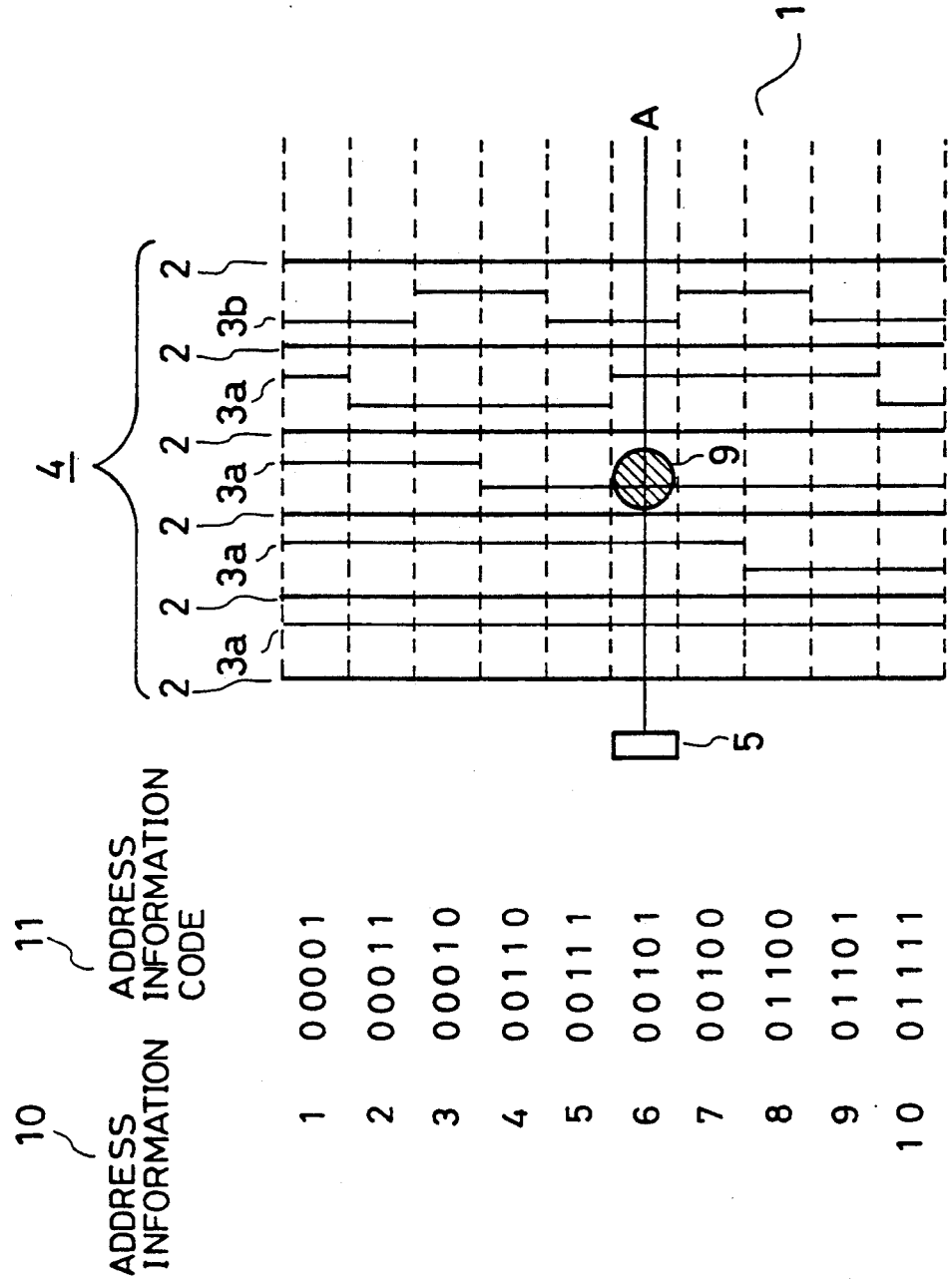

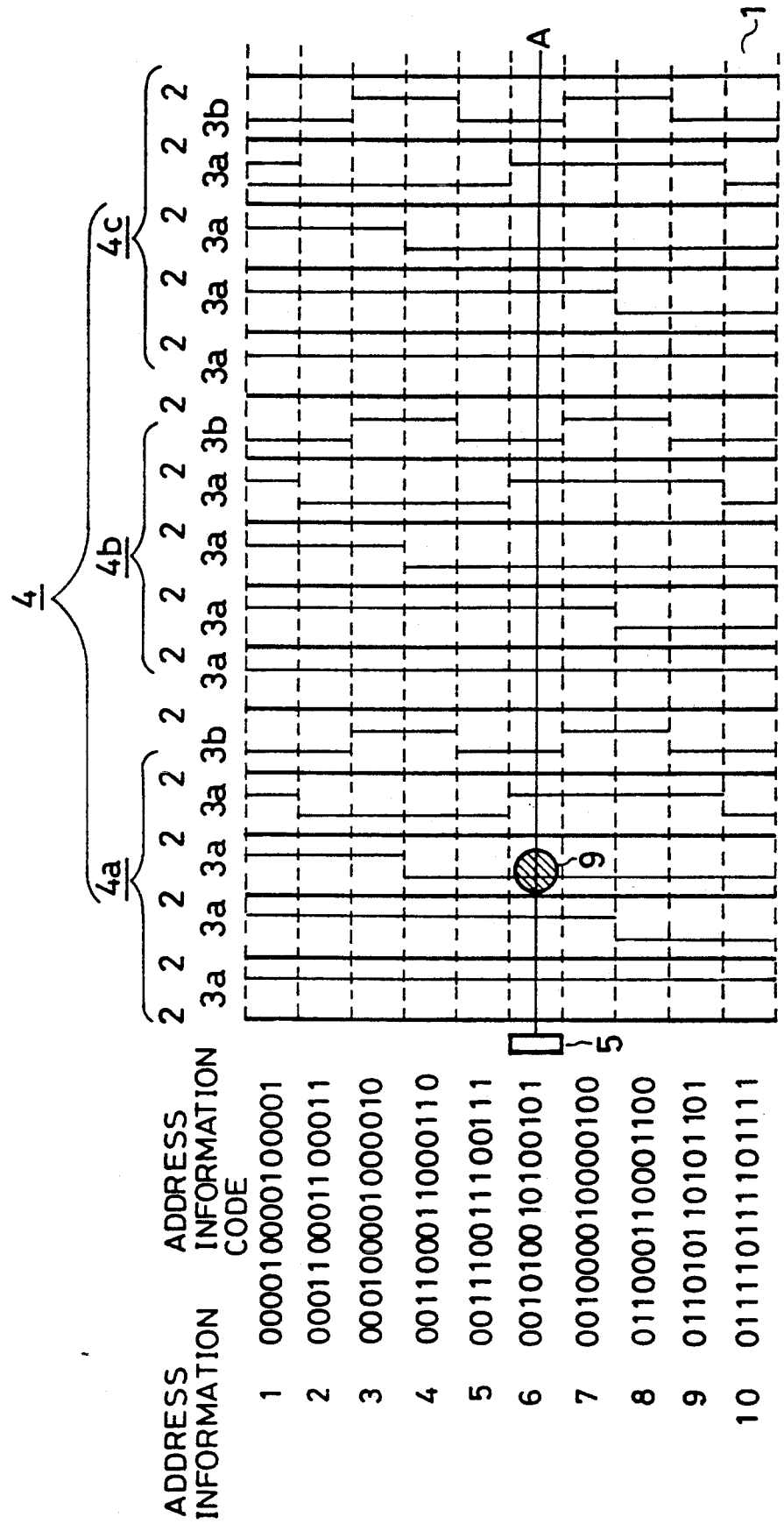

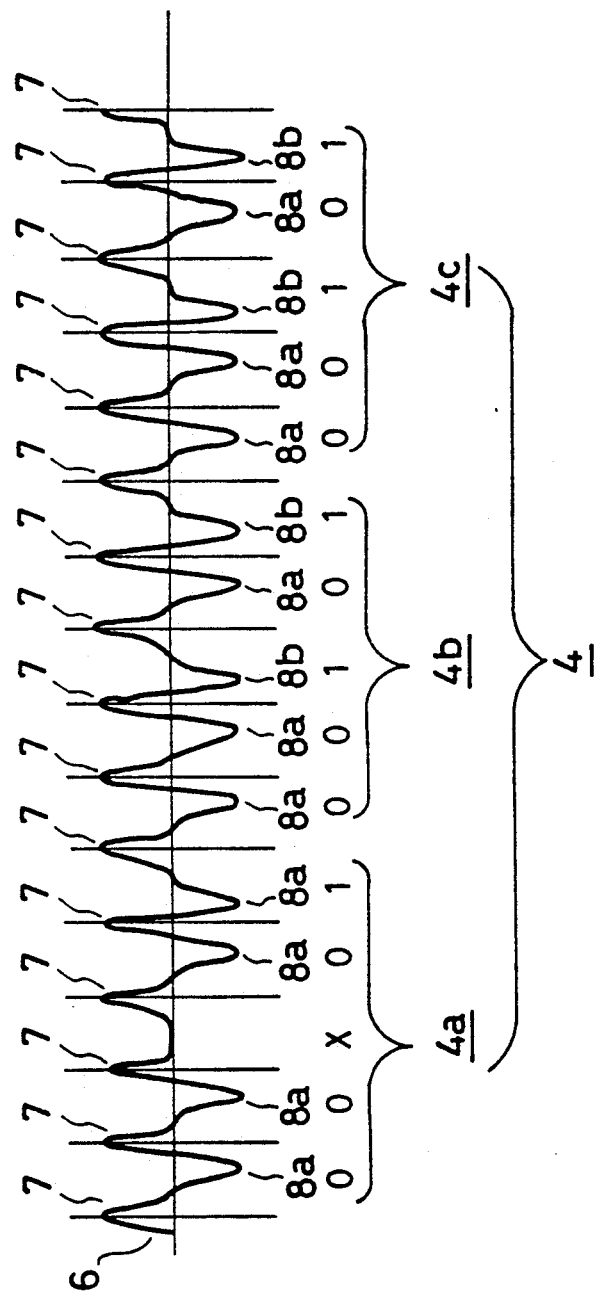

METHOD OF ENCODING POSITION INFORMATION

This application is a continuation of application Ser. No. 478,643, filed Feb. 12, 1990, now abandon.

BACKGROUND OF THE INVENTION

The present invention relates to methods of encoding position information, such as track addresses, for magnetic disk drives.

The position information about the recording portion of a recording medium is encoded and recorded in each recording portion for use in specifying the head position when data is read from or written into the recording portion. This will be described in more detail taking a magnetic disk for example.

In the magnetic disk, there are provided a plurality of concentric tracks, at a given track of which the magnetic head is positioned to write into or read data from the magnetic disk. Position or address information for positioning the magnetic head has been written in a portion of each track so that the magnetic head reads the address information for positioning. Sometimes, the address information is read during a seek period when the head moves over tracks. Consequently, the coding must be made so that reading errors are minimized. An example of such codes is Gray code described in Japanese Patent Application Kokai No. 55-55483 and *Mini-Micro System*, February 1983, pp. 219-226.

The Gray code used as an address information code will be described with reference to FIG. 11, wherein address information 10 is expressed in Gray code 11. A recording medium 1, such as a magnetic disk, contains clock information 2 which is expressed in magnetic inversion, and address information units or bits 3a and 3b which constitute a Gray code. The address information bits 3a and 3b represent "0" and "1" respectively. The clock information 2 and the coded address information bits 3a and 3b constitute address or position information 4. A magnetic head 5 moves along a locus A to read such magnetically recorded information.

The operation will be described with reference to FIG. 12. The magnetic head 5 reads out the address information 4 to provide an address signal 6 which is composed of a clock signal 7 (produced by reading the clock information 2 and address signal bits 8a and 8b (produced by reading the encoded address information bits 3a and (3b). The address signal bits 8a and 8b representing "0" and "1", respectively, constitute an address signal. It is apparent from the graph that the address information bit 8b read out within T/2 from the clock signal 7 is recognized as "1" while the address information bit 8a read out in a period between T/2 and T is recognized as "0", wherein T is the period of a clock signal. In this way, the address information 4 expressed in Gray code and recorded on the recording medium 1 is reproduced.

The case where the recording medium 1 has a defective spot 9 will be described with reference to FIG. 13. If no magnetic inversion is recorded on the defective spot 9, then the address signal 6 read by the magnetic head 5 moving along the locus A is such as shown in FIG. 14. This address signal 6 does not have one "1" signal bit 8b because of the defective spot 9. Consequently, it is impossible to determine whether the address information 10 is "00001" or "00101" and it is impossible to reproduce the encoded information. In this way, if one of address information bits in Gray code cannot be read because of a defective spot, the encoded address information cannot be reproduced.

To solve this problem, Japanese Patent Application Kokoku No. 58-501,644 has proposed that recording a Gray code be repeated three times as shown in FIG. 15. For address information 4, three pieces of indentical address information 4a, 4b, and 4c are written in sequence. The address signal 6 read by the magnetic head 5 moving along the locus A is shown in FIG. 16(a). The address information 4a does not have one "1" signal bit 8b because of the defective spot 9 and, therefore it cannot provide the encoded address information 4. However, the two other pieces of address information 4b and 4c read out are correct so that the encoded address information 4 is reproduced under majority rule as shown in FIG. 16(b).

In general, recording media do not have a plurality of defective spots in series, and the above method is able to prevent most of errors resulting from the defective medium. However, the number of bits for encoding address information by this method is large; namely, $$l = 3 \times \log_2 m$$

wherein l is the number of bits and m is the number of pieces of address information. For example, the number of bits for encoding 32 pieces of address information is $$3 \times \log_2 32 = 15 \text{ bits.}$$

As has been described above, where Gray codes are used to encode address information, only one defective spot of a recording medium makes it impossible to reproduce the encoded address information, whereas if Gray codes are written three times, the number of bits used to encode address information becomes disadvantageously large.

SUMMARY OF THE INVENTION

Accordingly, it is an object of the invention to provide a method of encoding address information with a compensation function which makes it possible to reproduce the encoded address information even if part of the address signal cannot be read out because of a defective spot in the recording medium.

According to the invention there is provided a method of encoding position information of each recording portion on a recording medium with a predetermined number of information units, which includes the step of composing position information codes such that a first position information code of a first recording portion is different by one information unit from a second position information code of a second recording portion which is spaced by one recording portion from the first recording portion, by two information units from a third position information code of a third recording portion which is spaced by two recording portions from the first recording portion, and by three information units or more from a fourth position information code of a fourth recording portion which is spaced by three recording portions or more from the first recording portion.

Other objects, features, and advantages of the invention will be apparent from the following description when taken in conjunction with the accompanying drawings.

BRIEF DESCRIPTION OF THE DRAWINGS

FIG. 1 is a table showing address information encoded according to an embodiment of the invention;

FIG. 4 is a diagram showing the condition of a recording medium having a defective spot therein;

FIG. 6 is a diagram showing the condition of a recording medium having a defective spot at a different position from that of FIG. 4;

FIG. 8 is a table showing address information encoded according to a method other than that of the invention;

FIGS. 9 and 10 are tables showing address information encoded according to still other embodiments of the invention;

FIG. 13 is a diagram showing the condition of a recording medium having a defective spot therein;

FIG. 15 is a diagram showing the condition of a defective recording medium on which recording Gray code address information is repeated three times;

FIG. 16(a) is a graph showing the signal read by the magnetic head from the recording medium of FIG. 15; and FIG. 16(b) is a table showing the Gray code address information read out from the recording medium of FIG. 15.

DESCRIPTION OF THE PREFERRED EMBODIMENT

In FIG. 1, 32 pieces of address information 10 correspond to respective address information codes 11 expressed in bits. A column 12 represents the number of bits of each address information code which are different from those of the address information code 11 for the address "6". From the table it is apparent that the address information code is different by one bit from an address information code spaced by one track, by two bits from an address information code spaced by two tracks, by three bits from an address information code spaced by three tracks, and so on. This is true for any track of address information 10 from "1" through "32".

Figure 2:
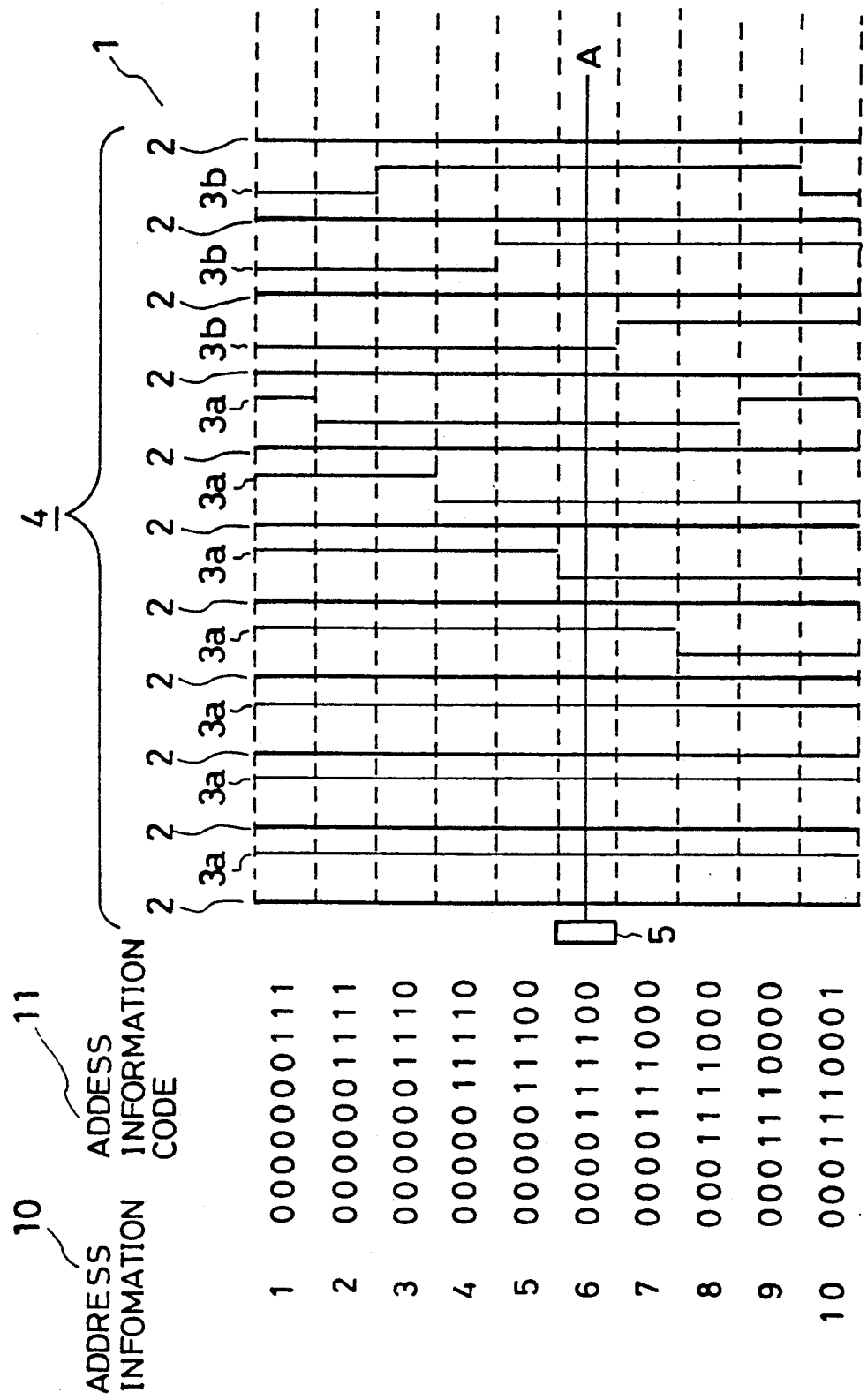
FIG. 2 is a diagram showing the condition of a recording medium on which the encoded address information is recorded.

In FIG. 2, part of the recording medium 1 on which the address information is encoded by the coding method of FIG. 1 is shown, with the address information 10 greater than "11" omitted.

Figure 3:
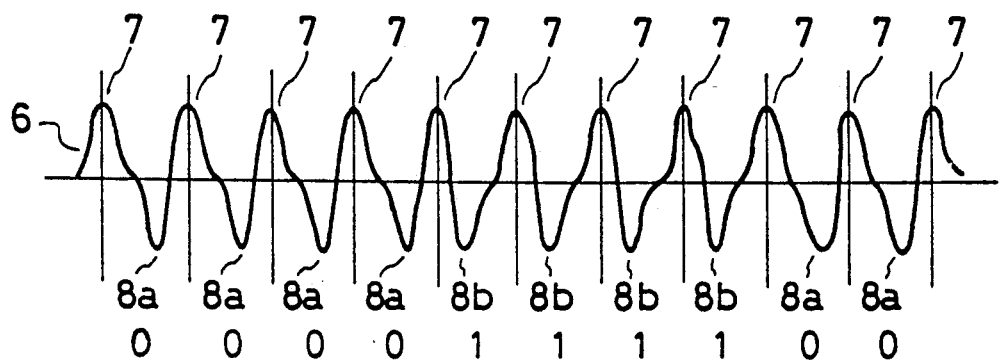
FIG. 3 is a graph showing the signal read by the magnetic head from the recording medium of FIG. 2.

In FIG. 3, the address signal 6 read by the magnetic head 5 moving along the locus A is shown. From this address signal 6, the encoded address information is reproduced in the same way as in the conventional Gray code.

Figure 5:
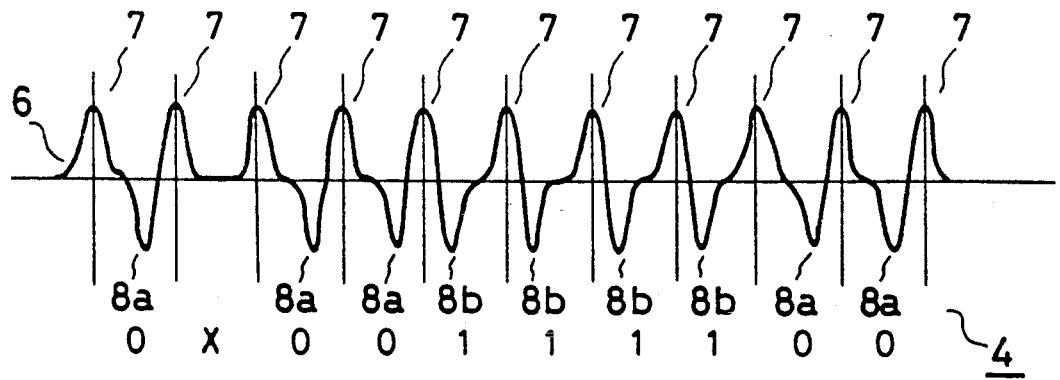
FIG. 5 is a graph showing the signal read by the magnetic head from the recording medium of FIG. 4.

In FIG. 4, there is a defective spot 9 in the recording medium 1. Address information 4 is recorded on the recording medium 1 by the coding method of FIG. 1. The address signal 6 read by the magnetic head 5 moving along the locus A is shown in FIG. 5. One "0" signal bit 8a is lost from the address signal 6 because of the defective spot 9. Consequently, the encoded address information reproduced becomes "0X00111100", in which the second bit is unknown. However, when the second bit "X" of the reproduced address information "0X00111100" is assumed to be "0", the reproduced address information agrees with the encoded address information "0000111100" for the address "6". Similarly, when the second bit "X" is assumed to be "1", the reproduced address information is closest to or different by only one bit from the encoded address information "0000111100" of the address "6". Hence, the desired address information code is "0000111100" for address "6".

Figure 7:
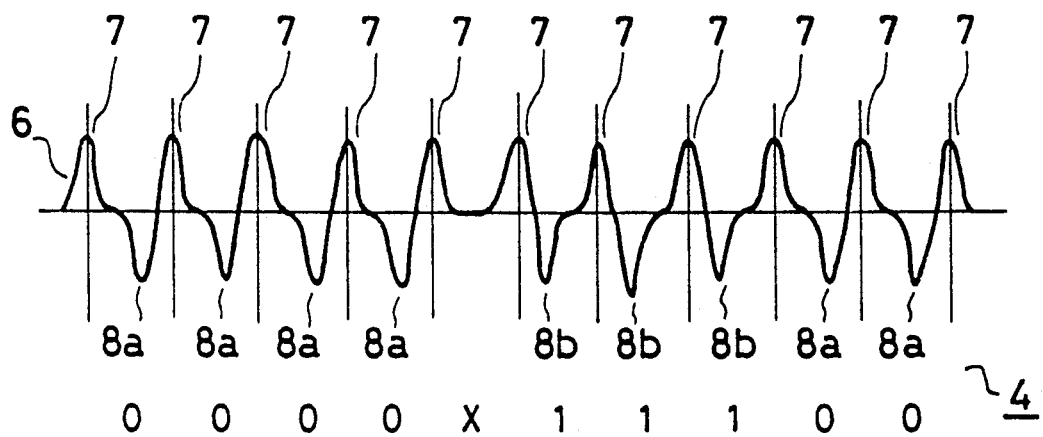
FIG. 7 is a graph showing the signal read by the magnetic head from the recording medium of FIG. 6.
Figure 11:
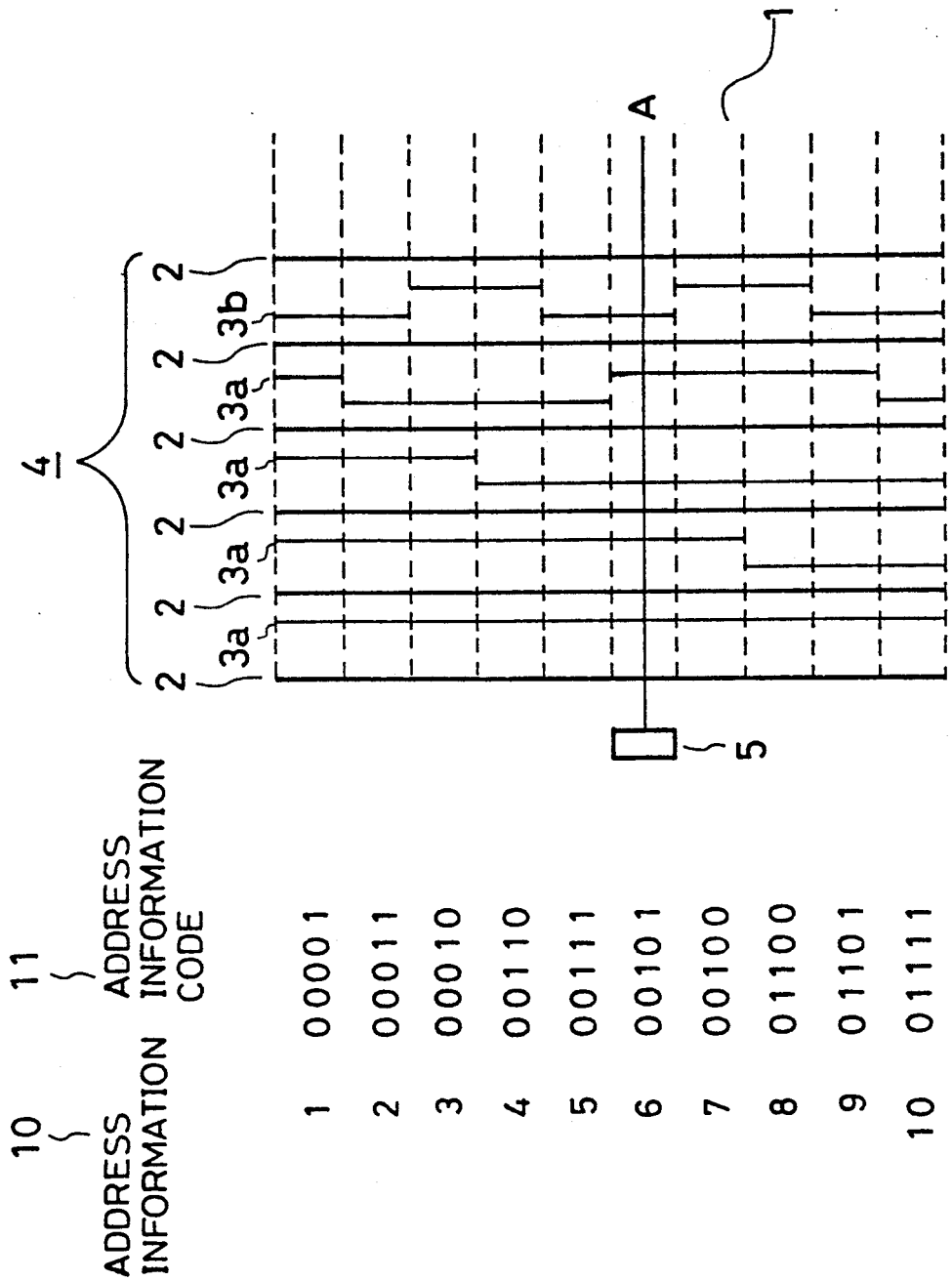
FIG. 11 is a diagram showing the condition of a recording medium on which address information encoded in conventional Gray code is recorded.
Figure 12:
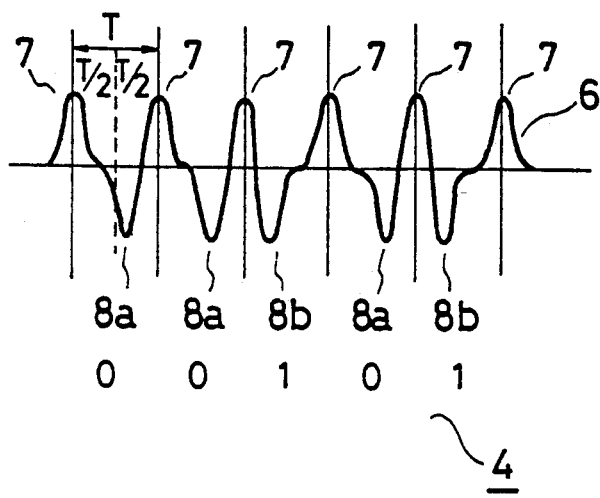
FIG. 12 is a graph showing the signal read by the magnetic head from the recording medium of FIG. 11.
Figure 14:
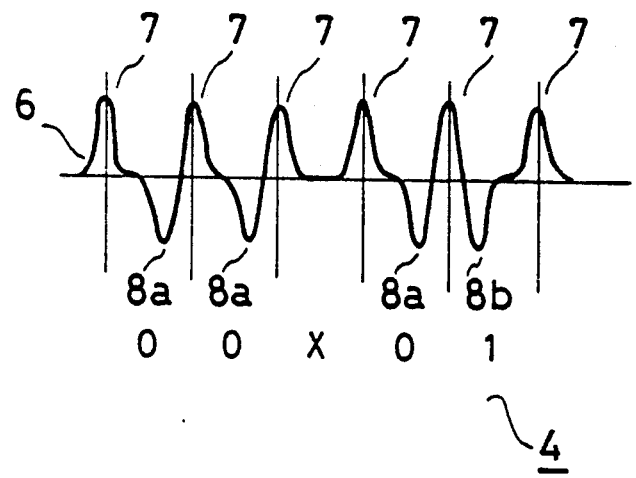
FIG. 14 is a graph showing the signal read by the magnetic head from the recording medium of FIG. 13.

In FIG. 6, there is a defective spot 9 in the recording medium 1. The address signal read by the magnetic head 5 moving along the locus A is shown in FIG. 7. One "1" signal bit 8b is lost from the address signal 6 because of the defective spot 9. Consequently, the reproduced address information code is "0000X11100", in which the fifth bit is unknown. When the fifth bit is assumed to be "0", the reproduced address information code agrees with the address information code "0000011100" for the address "5" in FIG. 1. When the fifth bit is assumed to be "1", the reproduced address information code agrees with the address information code "0000111100" for the address "6". Consequently, it is impossible to determine the target address information code, but the selection of either of the assumed address information codes provides the address of either the correct track or a track adjacent the correct track. Thus, the defective spot 9 has little influence on the determination of speed of the magnetic head during a seek period. If the magnetic head grasps the present position roughly, it is possible to provide appropriate instructions for the seek operation from the difference between the target track and the present track. After the seek operation, the magnetic head reads again the address information to finally adjust its position so that the movement in the initial seek period is considered successful as far as the magnetic head is near the target track.

The case where a value different from the original one is read because one of the information bits is inverted due to the defective spot 9 or due to noise present in the transmission line or amplifier will be described. Similarly to the above example, the address "6" is taken for example. If the first bit of the code "0000111100" for the address "6" is written as "1" instead of "0", the input value becomes "1000111100". This code does not match any address information code for addresses from "1" to "32". As stated above, it is impossible to determine the position of a defective spot. That is, it is impossible to determine the bit which is read incorrectly. However, a comparison with the code of each address from "1" to "32" shows that the address information code is different from those of the addresses from "1" to "4" by three bits or more, that of address "5" by two bits, that of address "6" by one bit, that of address "7" by two bits, and those of addresses from "8" to "32" by three bits or more. Hence, it is possible to determine that the closest code is that of the address "6".

The case where the fifth bit of the code "0000111100" for the address "6" is mistaken as "0" will be described.

The mistaken code "0000011100" agrees with the code of the address "5", and that address is mistaken for address "6". However, this is the address of the adjacent track so that the magnetic head detects its position with an error of no more than one track.

That tracks which are spaced from each other by three tracks or more must be different in code from each other by three bits or more will be described. In FIG. 8, an examination of the number of bits 12 which are different from those of the code of address "13" shows that the respective codes "0011100001" and "01111000011" of addresses "12" and "14" are different from the code "0111100001" of address "13" by one bit. The codes of addresses from "1" to "11" and from "15" to "32" are different from the code of "13" by two bits or more. For example, the code "0111000011" of "15" is different from the code of "13" by two bits. Also, the codes of "25" and "27" are different by two bits.

Under such coding conditions, it is assumed that the code "0111000001" of address "XX" at the bottom of the table is inputted. This code does not match any code of "1" through "32". Thus, the closest pattern is sought by considering that a certain bit is mistaken. The input code "0111000001" is different from the code "0111100001" of "13" and the code "0111000011" of "15" by one bit. Also, it is different from the code of "27" by one bit. That is, there are three codes which are different by one bit, and the corresponding addresses are spaced at distance. Hence, when misreading takes place, it is impossible to determine the target or adjacent track with only the information that the codes are different by two bits or more when they are spaced by two tracks or more. This is why the coding method capable of distinguishing three bits or more of difference for a space of three tracks or more is required.

According to the invention, a code is composed of information units less than a half of the number of addresses m, thus saving space. In FIG. 1, for example, 10 information units or bits are used to encode 32 addresses. (32/2=16>10). If the number of addresses increases, information units less than a half of the number of addresses are always sufficient to encode the addresses.

Alternatively, the tracks may be sectors, data, or blocks. The magnetic disks may be replaced by magnetic drums, optical disks, or compact disks having a plurality of recording portions. The number of bits is not necessarily 10 but may be a given number. The information units may be a plurality of bits, or numbers, characters or symbols. The address information may be replaced by position information such as XY coordinate information or postal address information.

The address information code of FIG. 1 may be replaced by the address information code of FIG. 9. Thus, it is apparent that there are a plurality of types of address information code that falls within the scope of the present invention.

In FIG. 10, redundancy are added to the address information codes to detect an error in reading the address information code, thereby increasing the reliability.

As has been described above, if there is a loss or mistake in the address signal, it is possible to reproduce the position information at the target or adjacent position, thereby increasing the reliability.

We claim:

1. A method of encoding position information for a group of recording portions on a recording medium, the recording medium having at least one group of recording portions, each group having a predetermined number of recording portions, each recording portion having a predetermined number of information units for storing a position information code indicating its position within the group, each recording unit within a group having an information code that differs from the information codes of every other recording unit within that group, said number of information units being less than one half the number of recording portions in the group, the method comprising the step of composing position information codes such that the position information code of any selected recording portion is different by one information unit from the position information codes of each recording portion spaced by one recording portion from said selected recording portion, by two information units from the position information codes of each recording portion spaced by two recording portions from said selected recording portion, and by three information units from the position information codes of each recording portion spaced by three recording portions from said selected recording portion.

2. The method of encoding position information according to claim 1, wherein said position information codes are composed of "0" and "1".

3. The method of encoding position information according to claim 1, wherein said information units are bits.

4. The method of encoding position information according to claim 1, wherein said predetermined number of information units is 10 bits.

5. The method of encoding position information according to claim 3, wherein when one of said bits of a position information code is unclear, said unclear bit is assumed to be either "0" or "1" to provide a position information code for said position information code.

6. The method of encoding position information according to claim 3, wherein when one of said bits of a target position information code is unclear, said unclear bit is assumed to be either "0" or "1" to provide a position information code which is compared with a position information code of each recording portion so that a position information code closest to said target position information code is taken.

7. A method of encoding position information for a group of recording units on a recording medium, the recording medium having at least one group of recording units, each group having a predetermined number of recording units, each recording unit having a predetermined number of information units for recording a position information code indicating its position within the group, each recording unit within a group having an information code that differs from the information codes of every other recording unit within that group, the number of information units being less than one half the number of recording units in the group, the method including the step of composing position information codes such that:

the position information code for any selected recording unit differs by one information unit from the position information codes for each recording unit spaced by one recording unit from the selected recording unit;

the position information code for the selected recording unit differs by two information units from the position information codes for each recording unit spaced by two recording units from the selected recording unit;

the position information code for the selected recording unit differs by three information units from the position information codes for each recording unit spaced by three recording units from the selected recording unit.

8. A method of reading position information from a group of recording units on a recording medium, each group having a predetermined number of recording units, each recording unit having a predetermined number of information bits for recording a position information code indicating its position within the group, each recording unit within a group having an information code that differs from the information codes of every other recording unit within that group, the position information code being recorded in the form of logic "0" and logic "1" bits, the number of information bits being less than one half the number of recording units within the group, the position information codes being composed such that, the position information code for any selected recording unit differs by one information unit from the position information codes for each recording unit spaced by one recording unit from the selected recording unit;

the position information code for the selected recording unit differs by two information units from the position information codes for each recording unit spaced by two recording units from the selected recording unit;

the position information code for the selected recording unit differs by three information units from the position information codes for each recording unit spaced by three recording units from the selected recording unit, the method including the steps of:

when one of said bits of a position information code is unclear, assuming that said unclear bit is a logic 0 to form a first assumed position information code;

determining whether the first assumed position information code matches a position information code for any of the recording units within the group, if the first assumed position information code matches a first identical position information code, substituting the first identical information code for the unclear position information code;

if the first assumed position information code does not match any position information code within the group, executing the following steps;

assuming that said unclear bit is a logic 1 to form a second assumed position information code, determining whether the second assumed position information code matches a position information code for any of the recording units within the group;

if the second assumed position information code matches a second identical position information code, substituting the second identical information code for the unclear position information code.

9. A method of reading position information as claimed in claim 8 including the steps of:

when neither the first nor second assumed position information code matches any position information code within the group, identifying a closest position information code within the group that differs from the first and second assumed position information codes by the fewest number of bits;

substituting the closest position information code for the unclear position information code.

10. A method of reading position information from a group of recording units on a recording medium, each group having a predetermined number of recording units, each recording unit having a predetermined number of information bits for recording a position information code indicating its position within the group, each recording unit within a group having an information code that differs from the information codes of every other recording unit within that group, the position information code being recorded in the form of logic "0" and logic "1" bits, the number of information bits being less than one half the number of recording units, the position information codes being composed such that, the position code for any selected recording unit differs by one information unit from the position information codes for each recording unit spaced by one recording unit from the selected recording unit;

the position information code for the selected recording unit differs by two information units from the position information codes for each recording unit spaced by two recording units from the selected recording unit;

the position information code for the selected recording unit differs by three information units from the position information codes for a each recording unit spaced by three recording units from the selected recording unit, the method including the steps of:

when one of said bits of a position information code is unclear, assuming that said unclear bit is a logic 1 to form a first assumed position information code;

determining whether the first assumed position information code matches a position information code for any of the recording units within the group, if the first assumed position information code matches a first identical position information code, substituting the first identical information code for the unclear position information code;

if the first assumed position information code does not match any position information code within the group, executing the following steps;

assuming that said unclear bit is a logic 0 to form a second assumed position information code, determining whether the second assumed position information code matches a position information code for any of the recording units within the group;

if the second assumed position information code matches a second identical position information code, substituting the second identical information code for the unclear position information code.

11. A method of reading position information as claimed in claim 10 including the steps of:

if neither the first nor second assumed position information code matches any position information code within the group, identifying a closest position information code within the group that differs from the first and second assumed position information codes by the fewest number of bits;

substituting the closest position information code for the unclear position information code.

12. A method of encoding position information for a group of recording units on a recording medium, the recording medium having at least one group of recording portions, each group having a predetermined number of recording units, the method including the steps of:

for each recording unit, establishing a predetermined number of information units indicating the position of the recording unit within the group, each recording unit within a group having an information code that differs from the information codes of every other recording unit within that group;

encoding the information units such that;

the position information code for any selected recording unit differs by one information unit from the position information codes for each recording unit spaced by one recording unit from the selected recording portion;

the position information code for the selected recording unit differs by two information units from the position information codes for each recording unit spaced by two recording units from the selected recording unit;

the position information code for the selected recording unit differs by three information units from the position information codes for each recording unit spaced by three recording units from the selected recording unit; and the number of information units is less than one half the number of recording units within the group.

13. A method of encoding position information for a group of recording units on a recording medium, the recording medium having at least one group of recording units, each group having a predetermined number of recording units, each recording unit having a predetermined number of information units for recording a position information code indicating its position within the group, each recording unit within a group having an information code that differs from the information codes of every other recording unit within that group, each information unit being capable of storing first and second values, the method including the step of encoding the information units such that;

the position information code for any selected recording unit differs by one information unit from the position information codes for each recording unit spaced by one recording unit from the selected recording unit;

the position information code for the selected recording unit differs by two information units from the position information codes for each recording unit spaced by two recording units from the selected recording unit;

the position information code for the selected recording unit differs by three information units from the position information codes for each recording unit spaced by three recording units from the selected recording unit; and at least one recording unit has a position information code including at least first, second and third information units, the second information unit being positioned between the first and third information units, said first and third information units storing the first value and the second information unit storing the second value.

14. A recording medium having at least one group of recording units, each group having a predetermined number of recording units, each recording unit having a predetermined number of information units for recording a position information code indicating its position within the group, each recording unit within a group having an information code that differs from the information codes of every other recording unit within that group;

the number of information units being less than one half the number of recording units within the group;

the information units being encoded such that: the position information code for any selected recording unit differs by one information unit from the position information codes for each recording unit spaced by one recording unit from the selected recording unit;

the position information code for the selected recording unit differs by two information units from the position information codes for each recording unit spaced by two recording units from the selected recording unit; and the position information code for the selected recording unit differs by three information units from the position information codes for each recording unit spaced by three recording units from the selected recording unit.

15. A recording medium having at least one group of recording units, each group having a predetermined number of recording units, each recording unit having a predetermined number of information units for recording a position information code indicating its position within the group, each recording unit within a group having an information code that differs from the information codes of every other recording unit within that group, each information unit being capable of storing first and second values;

the information units being encoded such that:

the position information code for any selected recording unit differs by one information unit from the position information codes for each recording unit spaced by one recording unit from the selected recording unit;

the position information code for the selected recording unit differs by two information units from the position information codes for each recording unit spaced by two recording units from the selected recording unit; and the position information code for the selected recording unit differs by three information units from the position information codes for each recording unit spaced by three recording units from the selected recording unit; and at least one recording unit has a position information code including at least first, second and third information units, the second information unit being positioned between the first and third information units, said first and third information units storing the first value and the second information unit storing the second value.

16. A method of encoding position information of each recording portion on a recording medium having a plurality of recording portions, each recording portion having position information encoded by a predetermined number of information units, comprising the step of composing position information such that:

said information unit forms a position pattern consisting of binaries of "0" and "1" having at least three bits;

said position pattern consists of a predetermined number of "0"s and "1"s; and the position pattern of a particular portion is different by one in the number of "0"s or "1"s from the position pattern of a recording portion which is spaced by one recording portion from said particular recording portion, by two in the number of "0"s or "1"s from the position pattern of a recording portion which is spaced by two recording portions from said particular recording portion, and by three in the number of "0"s or "1"s from the position pattern of a recording portion which is spaced by three recording potions from said particular recording portion.

17. A method of encoding position information for a group of recording units on a recording medium, the recording medium having at least one group of recording units, each group having a predetermined number of recording units N, each recording unit having a predetermined number of information units for recording a position information code indicating its position within the group, each recording unit within a group having an information code that differs from the information codes of every other recording unit within that group, the number of information units being less than one half N, the method including the step of composing position information codes such that:

the position information code for any selected recording unit differs by one information unit from the position information codes for each recording unit spaced by one recording unit from the selected recording unit, and for each recording unit spaced by N−1 recording units from the selected recording unit;

the position information code for the selected recording unit differs by two information units from the position information codes for each recording unit spaced by two recording units from the selected recording unit, and for each recording unit spaced by N−2 recording units from the selected recording unit;

the position information code for the selected recording unit differs by at least three information units from the position information codes for each recording unit spaced by more than two and less than N−2 recording units from the selected recording unit.

18. A method of reading position information from a group of recording units on a recording medium, each group having a predetermined number of recording units, each recording unit having a predetermined number N of information bits for recording a position information code indicating its position within the group, each recording unit within a group having an information code that differs from the information codes of every other recording unit within that group, the position information code being recorded in the form of logic "0" and logic "1" bits, the number of information bits being less than one half N, the position information codes being composed such that, the position information code for any selected recording unit differs by one information unit from the position information codes for each recording unit spaced by one recording unit from the selected recording unit, and for each recording unit spaced by N−1 recording units from the selected recording unit;

the position information code for the selected recording unit differs by two information units from the position information codes for each recording unit spaced by two recording units from the selected recording unit, and for each recording unit spaced by N−2 recording units from the selected recording unit;

the position information code for the selected recording unit differs by at least three information units from the position information codes for each recording unit spaced by more than two and less than N−2 recording units from the selected recording unit;

the method including the steps of:

when one of said bits of a position information code is unclear, assuming that said unclear bit is a logic 0 to form a first assumed position information code;

determining whether the first assumed position information code matches a position information code for any of the recording units within the group.

if the first assumed position information code matches a first identical position information code, substituting the first identical information code for the unclear position information code;

if the first assumed position information code does not match any position information code within the group, executing the following steps;

assuming that said unclear bit is a logic 1 to form a second assumed position information code, determining whether the second assumed position information code matches a position information code for any of the recording units within the group;

if the second assumed position information code matches a second identical position information code, substituting the second identical information code for the unclear position information code.

19. A method of encoding position information for a group of recording units on a recording medium, the recording medium having at least one group of recording portions, each group having a predetermined number N of recording units, the method including the steps of:

for each recording unit, establishing a predetermined number of information units indicating the position of the recording unit within the group, each recording unit within a group having an information code that differs from the information codes of every other recording unit within that group;

encoding the information units such that;

the position information code for any selected recording unit differs by one information unit from the position information codes for each recording unit spaced by one recording unit from the selected recording unit, and for each recording unit spaced by N−1 recording units from the selected recording unit;

the position information code for the selected recording unit differs by two information units from the position information codes for each recording unit spaced by two recording units from the selected recording unit, and for each recording unit spaced by N−2 recording units from the selected recording unit;

the position information code for the selected recording unit differs by at least three information units from the position information codes for each recording unit spaced by more than two and less than N−2 recording units from the selected recording unit; and the number of information units is less than one half N.

20. A recording medium having at least one group of recording units, each group having a predetermined number N of recording units, each recording unit having a predetermined number of information units for recording a position information code indicating its position within the group, each recording unit within a group having an information code that differs from the information codes of every other recording unit within that group;
  the number of information units being less than one half N;
  the information units being encoded such that:
  the position information code for any selected recording unit differs by one information unit from the position information codes for each recording unit spaced by one recording unit from the selected recording unit, and for each recording unit spaced by $N-1$ recording units from the selected recording unit;
  the position information code for the selected recording unit differs by two information units from the position information codes for each recording unit spaced by two recording units from the selected recording unit, and for each recording unit spaced by $N-2$ recording units from the selected recording unit; and
  the position information code for the selected recording unit differs by at least three information units from the position information codes for each recording unit spaced by more than two and less than $N-2$ recording units from the selected recording unit.

21. A recording medium having at least one group of recording units, each group having a predetermined number N of recording units, each recording unit having a predetermined number of information units for recording a position information code indicating its position within the group, each recording unit within a group having an information code that differs from the information codes of every other recording unit within that group, each information unit being capable of storing first and second values;
  the information units being encoded such that:
  the position information code for any selected recording unit differs by one information unit from the position information codes for each recording unit spaced by one recording unit from the selected recording unit, and for each recording unit spaced by $N-1$ recording units from the selected recording unit;
  the position information code for the selected recording unit differs by two information units from the position information codes for each recording unit spaced by two recording units from the selected recording unit, and for each recording unit spaced by $N-2$ recording units from the selected recording unit;
  the position information code for the selected recording unit differs by at least three information units from the position information codes for each recording unit spaced by more than two and less than $N-2$ recording units from the selected recording unit; and
  at least one recording unit has a position information code including at least first, second and third information units, the second information unit being positioned between the first and third information units, said first and third information units storing the first value and the second information unit storing the second value.

* * * * *